(12) United States Patent
Sawchuk et al.

(10) Patent No.: US 10,190,900 B2
(45) Date of Patent: Jan. 29, 2019

(54) METHOD OF FLUID FLOW MEASUREMENT USING NOZZLE BANK

(71) Applicant: Canada Pipeline Accessories Company Ltd., Calgary (CA)

(72) Inventors: Blaine Sawchuk, De Winton (CA); Dale Sawchuk, Calgary (CA); Daniel Sawchuk, Chestermere (CA)

(73) Assignee: Canada Pipeline Accessories Company, Ltd., Calgary (CA)

( * ) Notice: Subject to any disclaimer, the term of this patent is extended or adjusted under 35 U.S.C. 154(b) by 0 days.

(21) Appl. No.: 15/942,653

(22) Filed: Apr. 2, 2018

(65) Prior Publication Data
US 2018/0292246 A1 Oct. 11, 2018

Related U.S. Application Data

(60) Provisional application No. 62/481,871, filed on Apr. 5, 2017.

(51) Int. Cl.
*G01F 1/84* (2006.01)
*G01F 1/42* (2006.01)

(52) U.S. Cl.
CPC .............. *G01F 1/8477* (2013.01); *G01F 1/42* (2013.01); *G01F 1/84* (2013.01); *G01F 1/8413* (2013.01)

(58) Field of Classification Search
CPC ..... G01F 1/05; G01F 1/40; G01F 1/66; F15D 1/02
See application file for complete search history.

(56) References Cited

U.S. PATENT DOCUMENTS

| | | | | |
|---|---|---|---|---|
| 7,823,462 B2 * | 11/2010 | Brown | ................... | G01F 1/662 |
| | | | | 73/861.27 |
| 9,506,484 B2 * | 11/2016 | Brown | ................... | F15D 1/025 |
| 2016/0054158 A1 * | 2/2016 | MacKenzie | ........... | A62C 35/62 |
| | | | | 73/49.5 |
| 2016/0097411 A1 * | 4/2016 | Sawchuk | .......... | F16L 55/02709 |
| | | | | 138/39 |
| 2016/0334249 A1 * | 11/2016 | Sawchuk | ................. | G01F 1/40 |

OTHER PUBLICATIONS

Meier, "Oscillations of the Supersonic Flow Downstream of an Abrupt Increase in Duct Cross Section", AIAA Journal, Apr. 1980, pp. 394-395, vol. 18.

Studzinski et al., "Nova's Gravimetric Meter Prover and Sonic Nozzle Facility", International Fluid Flow Symposium, San Antonio, TX, Mar. 20-22, 1995.

Meier et al., "Oscillations of the Supersonic Flow Downstream of an Abrupt Increase in Duct Cross-section", Mitteilingen aus dem Max-Planck-Institute for Strömungsforschung und der Aerodynamischen Versuchsanstalt, Nr.65 Gottingen 1978, 7-172.

* cited by examiner

*Primary Examiner* — Jewel V Dowtin
(74) *Attorney, Agent, or Firm* — Cahn & Samuels, LLP

(57) ABSTRACT

A method for measuring fluid flow within a fluid flow pipe includes partitioning a fluid flow within a pipeline with a nozzle bank, wherein a predetermined number of stepped nozzles is open; measuring the fluid flow in at least one partitioned fluid stream with at least one mass flow device; and calculating a total fluid flow within the pipeline. The nozzle bank includes a plurality of nozzles, each nozzle having a single step at about 1 throat diameter from an inlet plane of the nozzle, wherein the single step is an increase corresponding to about 10% of the throat diameter and has a length of about throat diameter/2.

7 Claims, 3 Drawing Sheets

METHOD OF FLUID FLOW MEASUREMENT USING NOZZLE BANK

This application claims priority to U.S. Ser. No. 62/481,871 filed in the U.S. Patent and Trademark Office on Apr. 5, 2017, the entirety of which is incorporated herein by reference.

FIELD OF INVENTION

The present invention relates to a nozzle having a single step and use of a nozzle bank comprising a plurality of the stepped nozzles for measuring fluid flow in a pipeline, for example, chemical, natural gas, or other gas phase fluid pipelines.

Flow measurement accuracy is dependent on using pressure, temperature, and fluid composition to determine flow rate. The nozzle bank of the present invention lessens or eliminates the need to calculate pressure and temperature in a pipeline by using stepped nozzles to partition the fluid flow into at least one separate, smaller portion that can be measured directly with a mass flow device, like a gravimetric meter prover or a mass flow meter.

BACKGROUND OF INVENTION

Existing sonic nozzles are utilized in industry as flow meter devices. Flow rates are calculated using fluid dynamic and thermodynamic relationships to calculate flow rate. However, there are inherent uncertainties associated with calculating flow rates in this manner.

In addition, existing nozzle banks utilize conventional de Laval nozzles, which have a smooth throat. A differential pressure is applied to the nozzle bank at sufficient pressure to induce sonic flow rate. There is a sensitivity of the mass flow rate through the nozzles due to changes in pressure across the bank. This sensitivity is due to the transfer of mass flow through the nozzle bank via a sub-sonic fluid flow boundary layer in each nozzle. This boundary layer effect adversely affects measurement accuracy. In contrast, to nozzles having a smooth throat, there are also known nozzles having abrupt changes in cross section.

SUMMARY OF INVENTION

A nozzle for a fluid flow pipeline according to the present invention comprises a nozzle having a single step at about 1 throat diameter from an inlet plane of the nozzle, wherein the single step comprises an increase in diameter corresponding to about 10% of the throat diameter and has a length of about throat diameter/2.

According to an embodiment of the present invention, a nozzle bank for fluid flow measurement comprises a plurality of the stepped nozzles.

According to another embodiment of the present invention, a pipe assembly for flow measurement comprises a fluid flow pipeline; a nozzle bank disposed in the fluid flow pipeline in an orientation substantially perpendicular to a longitudinal axis of the fluid flow pipeline; and at least one gravimetric or mass flow device.

According to yet another embodiment of the present invention, a method for measuring fluid flow within a fluid flow pipeline comprises partitioning a fluid flow within a pipeline with a nozzle bank, wherein a predetermined number of stepped nozzles is open; measuring the fluid flow in at least one of a number of partitioned fluid streams with at least one mass flow device; and calculating a total fluid flow within the pipeline.

It is advantage of the present invention that flow rate in a fluid flow pipeline can be accurately determined by measuring the flow rate of at least one stream partitioned by a stepped nozzle and without the use of any thermodynamic or fluid dynamic calculations.

As used herein "substantially", "relatively", "generally", "about", and "approximately" are relative modifiers intended to indicate permissible variation (e.g., ±1%, ±2%, ±5%, ±10%, ±20%) from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

Given the following enabling description of the drawings, the methods and systems should become evident to a person of ordinary skill in the art.

DETAILED DESCRIPTION OF INVENTION

The present invention relates to a nozzle having a single step and the use of a nozzle bank comprising a plurality of the stepped nozzles for measuring fluid flow in a pipeline.

According to the present invention, a nozzle has a single step within the nozzle throat that causes an oblique shock wave in the throat of the nozzle. This oblique shock wave effectively closes off the unaccounted for boundary layer flow in the nozzle, thereby causing the mass flow rate to be extremely accurate, accounted for, and stable.

Figure 1:
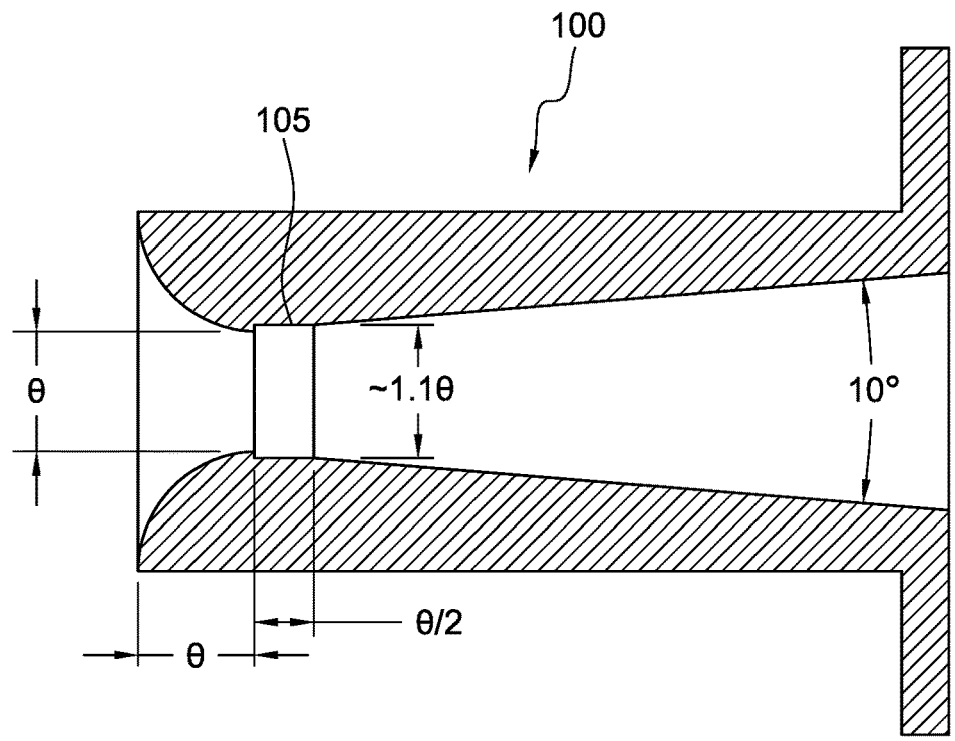
FIG. 1 illustrates a nozzle having a single step according to an embodiment of the present invention.

According to the present invention, a nozzle 100 has a single step 105 at about 1 throat diameter $\theta$ from an inlet plane of the nozzle, as shown in FIG. 1.

In specific embodiments, the single step comprises an increase in diameter corresponding to about 10% of the throat diameter. Thus, at about 1 throat diameter from the inlet plane of the nozzle, there is a cut machined into the wall of the nozzle so that the throat diameter increases about 10%. In specific embodiments, the single step has a length of about throat diameter $\theta/2$.

According to the present invention, the single step may be is sized in relation to the throat diameter, which is determined by the following formula:

$$\Theta = \sqrt{\frac{4\, m_{nozzle}}{e v \pi}}$$

wherein:
Θ=nozzle throat diameter
$m_{nozzle}$=mass flow rate of each single nozzle;
e=fluid (e.g., gas) density at the nozzle throat;
v=velocity of the fluid at the throat; if the fluid flow is choked flow v=Mach 1.

The present invention is also directed to a nozzle bank including a plurality of the stepped nozzles. The number of stepped nozzles may be selected by one of ordinary skill in the art according to the pipe assembly into which the nozzle bank is to be installed, for example, 2 to 100 or more stepped nozzles. In a specific embodiment, the number of stepped nozzles may be, for example, the total pipeline mass flow divided by the mass flow rate of one stepped nozzle. The mass flow rate of each stepped nozzle is dependent of the mass flow capability of the gravimetric weight system or a meter flow capacity.

Figure 2:
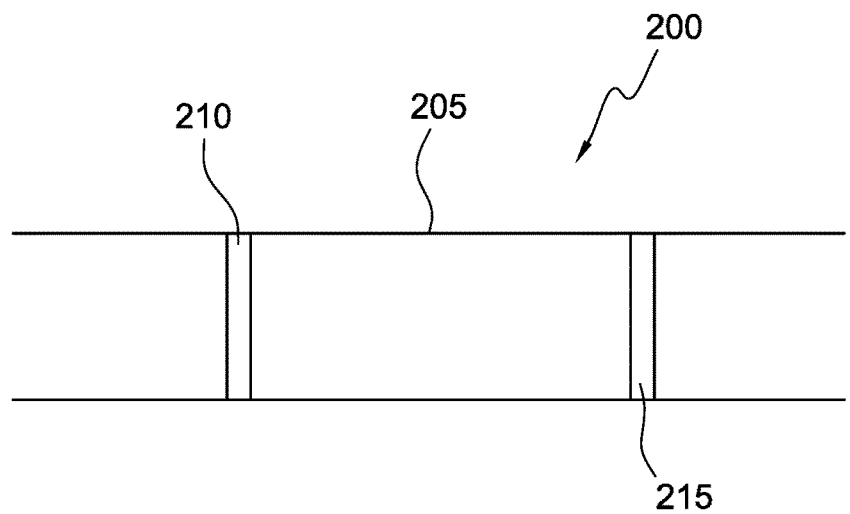
FIG. 2 illustrates a fluid flow pipeline with a nozzle bank according to the present invention and a flow meter downstream of the nozzle bank.

As shown in FIG. 2, a pipe assembly 200 for fluid flow measurement according to the present invention comprises a fluid flow pipeline 205; a nozzle bank 210 disposed in the fluid flow pipeline in an orientation substantially perpendicular to a longitudinal axis of the fluid flow pipeline; and at least one gravimetric or mass flow device 215.

According to the present invention, a method for measuring fluid flow within a fluid flow pipeline comprises partitioning a fluid flow within a pipeline with a nozzle bank, wherein a predetermined number of stepped nozzles is open; measuring the fluid flow in at least one of a number of partitioned fluid streams with at least one mass flow device; and calculating a total fluid flow within the pipeline. Thus, according to the present invention, the stepped nozzles are not flow meters, but rather are fluid flow partitioning devices.

Figure 3:
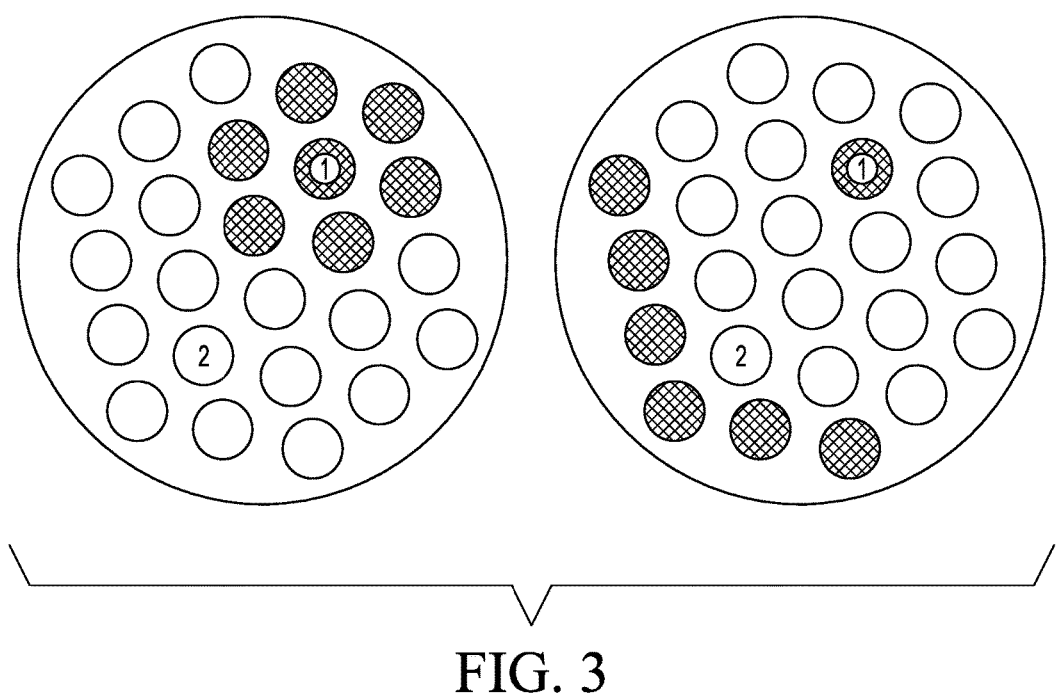
FIG. 3 illustrates a nozzle bank according to an embodiment of the present invention with a subset of nozzles open.

As shown in FIG. 3, a predetermined number of stepped nozzles may be open (1) while the other stepped nozzles may be closed (2). In embodiments, the number of stepped nozzles that are open may include the total number N or a subset thereof (n). The number of stepped nozzles that are set to be open may correspond to a number of equal and independent flow rates that are smaller than the flow rate within the entire pipe (total pipe flow). One or more of these smaller, partitioned flows can then be measured independently with a gravimetric or mass flow device (e.g., a Coriolis mass flow meter) downstream of the nozzle bank.

The total pipe flow may be calculated as the number of stepped nozzles that are open multiplied by the flow rate of at least one stepped nozzle that is measured. This measurement avoids the use of any thermodynamic or fluid dynamic calculations and the uncertainties associated with the longer and more complex flow rate calculation methodology.

Figure 4:
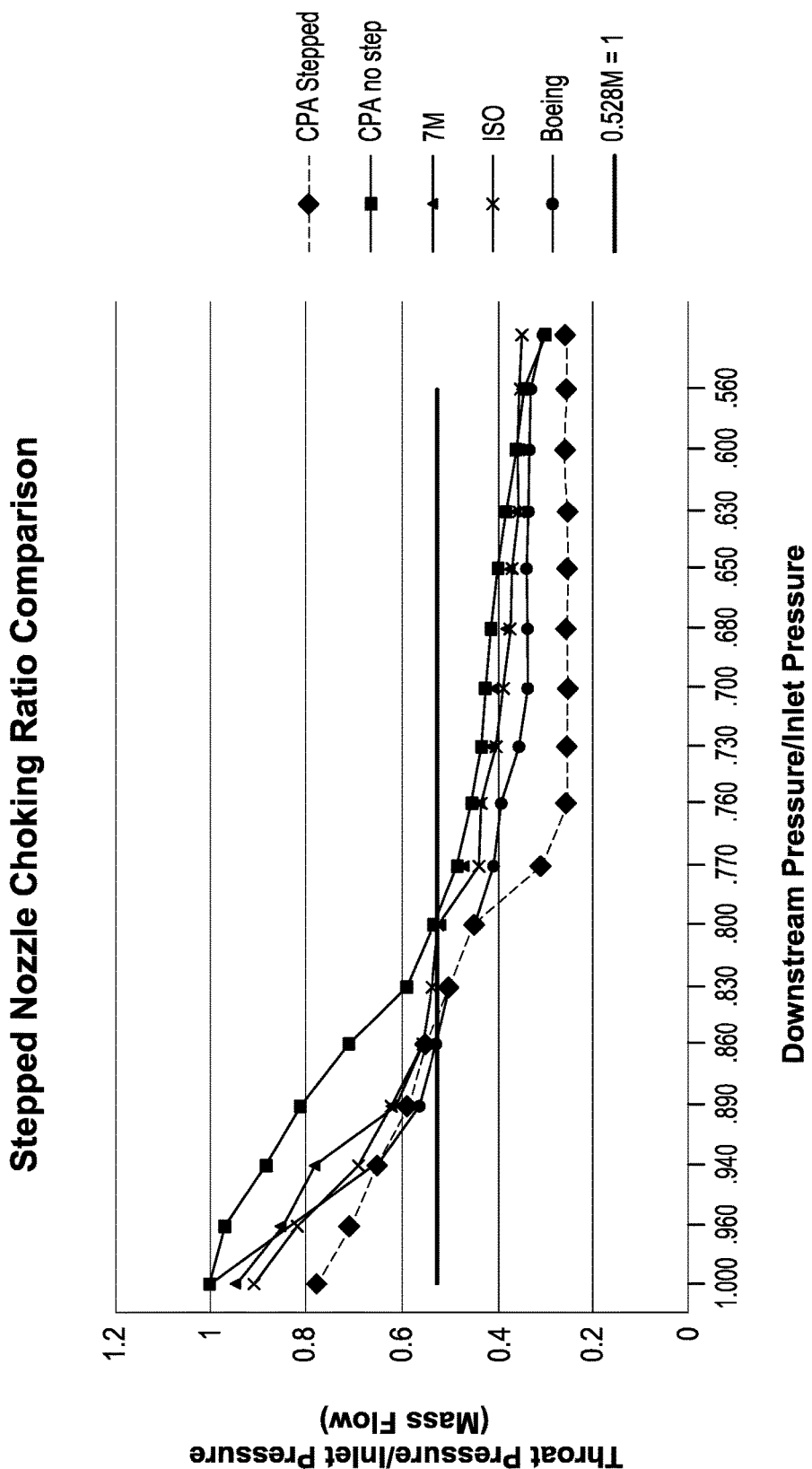
FIG. 4 is a graph illustrating a choking ratio comparison between the stepped nozzle of the present invention and other nozzles.

FIG. 4 is a graph of mass stability (nozzle throat pressure/nozzle inlet pressure) vs. pressure ratio (ratio of the downstream pressure/nozzle inlet pressure) for the stepped nozzle according to the present invention (as shown in FIG. 1) in comparison with other nozzles. The pressures were measured with differential pressure transmitters via gauge lines and/or pressure taps.

Theoretically, supersonic nozzles isolate upstream from downstream conditions via a shock wave within the nozzle throat when the pressure ratio reaches a critical level. Once this supersonic throat condition is met, no further increase in mass flow is exhibited even when the pressure ratio across the nozzle is increased (downstream pressure reduced). However, in actuality because of fluid dynamic boundary layer flow, there is not a full choking of the nozzle. This results in a sensitivity of the nozzle to increases in mass flow when the nozzle pressure ratio is changed. This sensitivity makes a corresponding nozzle bank inaccurate.

In FIG. 4, the comparative nozzles all indicate a sensitivity in mass stability (mass flow rate) to pressure ratio. The comparative nozzles are: Canada Pipieline Accessories (CPA) no step; American Society of Mechanical Engineers, standard 7M; Measurement of Gas Flow by Means of Critical Flow Venturis and Critical Flow Nozzles ISO-ISO 9300:2005; and Boeing.

In contrast, the nozzle according to the present invention exhibits a substantially unchanging rate of mass flow starting at the point at which the nozzle is thermodynamically choked. This "choking" occurs when the downstream pressure is a minimum of about 12% to 18% less than the nozzle upstream pressure.

When the ratio of nozzle throat pressure/nozzle inlet pressure reaches an accepted thermodynamically founded value of 0.528 (at Mach 1 at the nozzle throat), the nozzle can be assumed to be choked. Thus, the relationship between mass flow and pressure ratio no longer exists.

An increase in differential pressure ratio across a non-stepped or improperly designed stepped choked nozzle allows additional mass flow to proceed through the nozzle when the differential pressure is increased across the nozzle (this behavior is exhibited in FIG. 4 as a sloped line below the 0.528 pressure ratio). The nozzle of the present invention does not behave the same as differential pressure loss in a regular pipe fitting. The thermodynamic process of choking at the throat limits the mass flow rate and mass flow will no longer increase when the differential pressure across the nozzle is further increased because the unaccounted for flow of mass in the unchoked boundary layer is closed off by a shock wave produced at the step.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

The invention claimed is:

1. A method for measuring fluid flow within a fluid flow pipe, comprising:
    partitioning a fluid flow within a pipeline with a nozzle bank comprising a plurality of stepped nozzles, wherein a predetermined number of stepped nozzles is open;
    measuring the fluid flow in at least one partitioned fluid stream with at least one mass flow device; and
    calculating a total fluid flow within the pipeline,
    wherein each nozzle has a single step at about 1 throat diameter from an inlet plane of the nozzle, wherein the single step comprises an increase corresponding to about 10% of the throat diameter and has a length of about throat diameter/2.

2. A method according to claim 1, wherein the total fluid flow in the pipeline is calculated by a number stepped nozzles that are open multiplied by a flow rate measured for at least one open nozzle.

3. A method according to claim 1, wherein the nozzle bank comprises 2 to 100 stepped nozzles.

4. A method according to claim 1, wherein the predetermined number of stepped nozzles that are open is 1 to 10.

5. A method according to claim 1, wherein the mass flow device comprises a gravimetric meter prover.

6. A method according to claim 1, wherein the mass flow device comprises a mass flow meter.

7. A method according to claim 1, wherein the mass flow device comprises a Coriolis mass flow meter.

\* \* \* \* \*